United States Patent
Zinger et al.

(10) Patent No.: US 11,669,471 B2
(45) Date of Patent: Jun. 6, 2023

(54) SYSTEM AND METHOD FOR LOCKLESS ABORTING OF INPUT/OUTPUT (IO) COMMANDS

(71) Applicant: EMC IP Holding Company, LLC, Hopkinton, MA (US)

(72) Inventors: Eldad Zinger, Raanana (IL); Ran Anner, Tel Aviv (IL); Amit Engel, Tel Aviv (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/506,825

(22) Filed: Oct. 21, 2021

(65) Prior Publication Data

US 2023/0126265 A1    Apr. 27, 2023

(51) Int. Cl.
    *G06F 12/14*    (2006.01)
    *G06F 13/16*    (2006.01)

(52) U.S. Cl.
    CPC ............... *G06F 13/1668* (2013.01)

(58) Field of Classification Search
    CPC ........ G06F 13/1668; G06F 12/14; G06G 7/02
    See application file for complete search history.

(56) References Cited

U.S. PATENT DOCUMENTS

| | | | | |
|---|---|---|---|---|
| 8,180,971 | B2 * | 5/2012 | Scott | G06F 12/0842 711/119 |
| 9,390,023 | B2 * | 7/2016 | Kessler | G06F 9/00 |
| 9,525,737 | B2 * | 12/2016 | Friedman | G06F 12/0868 |
| 9,781,227 | B2 * | 10/2017 | Friedman | G06F 3/0619 |
| 9,875,024 | B2 * | 1/2018 | Schreter | G06F 3/0673 |
| 10,929,203 | B2 * | 2/2021 | Wolfson | G06F 9/52 |
| 10,931,450 | B1 * | 2/2021 | Chellappa | H04L 63/068 |
| 2020/0034214 | A1 * | 1/2020 | Vanco | G06F 9/5005 |
| 2022/0066831 | A1 * | 3/2022 | Gates | G06F 9/5027 |
| 2022/0413743 | A1 * | 12/2022 | Neverovitch | G06F 3/067 |

FOREIGN PATENT DOCUMENTS

CN    113051187 A    *   6/2021

* cited by examiner

*Primary Examiner* — Cheng Yuan Tseng
(74) *Attorney, Agent, or Firm* — Brian J. Colandreo; Heath M. Sargeant; Holland & Knight LLP (57) ABSTRACT

A method, computer program product, and computing system for receiving an input/output (IO) command for processing data within a storage system. An IO command-specific entry may be generated in a register based upon, at least in part, the IO command. An compare-and-swap operation may be performed on the IO command-specific entry to determine an IO command state associated with the IO command. The IO command may be processed based upon, at least in part, the IO command state associated with the IO command.

20 Claims, 7 Drawing Sheets

SYSTEM AND METHOD FOR LOCKLESS ABORTING OF INPUT/OUTPUT (IO) COMMANDS

BACKGROUND

Storing and safeguarding electronic content may be beneficial in modern business and elsewhere. Accordingly, various methodologies may be employed to communicate data between storage processors and storage arrays more efficiently.

Many storage systems utilize non-volatile memory express (NVMe) devices (i.e., NVMe drives or storage devices that support NVMEoF connectivity) according to the NVMe storage protocol and/or other storage protocols. Such storage protocols allow for IO command aborting/termination by issuing a subsequent IO command configured to instruct the storage system to abort or terminate the specified IO command. In the specific case of NVMe, an NVMe IO command may be submitted for processing on a particular IO submission queue of a specific storage controller. To abort a particular NVMe IO command, an NVMe IO abort command may be issued to the same storage controller that the NVMe IO command was submitted to. Conventional approaches to aborting NVMe IO commands require some lock over the command. The completion flow and the aborting flow will take the lock and thus the command state will be consistent with the applied logic. However, this approach hurts performance by requiring computationally heavy "lock" and "unlock" operations for every IO command even if it is not being aborted, and when an IO command is being aborted, it is undesirable to just "spin" in the completion flow.

SUMMARY OF DISCLOSURE

In one example implementation, a computer-implemented method executed on a computing device may include but is not limited to receiving an input/output (IO) command for processing data within a storage system. An IO command-specific entry may be generated in a register based upon, at least in part, the IO command. An compare-and-swap operation may be performed on the IO command-specific entry to determine an IO command state associated with the IO command. The IO command may be processed based upon, at least in part, the IO command state associated with the IO command.

One or more of the following example features may be included. Generating the IO command-specific entry in a register based upon, at least in part, the IO command includes generating the IO command-specific entry with one or more IO command parameters and a default IO command state. The storage system includes a non-volatile memory express (NVMe) storage system. The one or more IO parameters include one or more of: an NVMe Subsystem identifier; an NVMe controller identifier; an NVMe submission queue identifier; and an NVMe submission queue command identifier. The IO command state includes an IO command abort state. performing the compare-and-swap operation on the IO command-specific entry to determine the IO command state associated with the IO command includes one or more of: determining that the IO command abort state associated with the IO command is abortable; determining that the IO command abort state associated with the IO command is aborted; determining that the IO command abort state associated with the IO command is aborting; and determining that the IO command abort state associated with the IO command is complete. Processing the IO command based upon, at least in part, the IO command state associated with the IO command includes modifying the IO command abort state associated with the IO command based upon, at least in part, the compare-and-swap operation on the IO command-specific entry.

In another example implementation, a computer program product resides on a computer readable medium that has a plurality of instructions stored on it. When executed by a processor, the instructions cause the processor to perform operations that may include but are not limited to receiving an input/output (IO) command for processing data within a storage system. An IO command-specific entry may be generated in a register based upon, at least in part, the IO command. An compare-and-swap operation may be performed on the IO command-specific entry to determine an IO command state associated with the IO command. The IO command may be processed based upon, at least in part, the IO command state associated with the IO command.

One or more of the following example features may be included. Generating the IO command-specific entry in a register based upon, at least in part, the IO command includes generating the IO command-specific entry with one or more IO command parameters and a default IO command state. The storage system includes a non-volatile memory express (NVMe) storage system. The one or more IO parameters include one or more of: an NVMe Subsystem identifier; an NVMe controller identifier; an NVMe submission queue identifier; and an NVMe submission queue command identifier. The IO command state includes an IO command abort state. performing the compare-and-swap operation on the IO command-specific entry to determine the IO command state associated with the IO command includes one or more of: determining that the IO command abort state associated with the IO command is abortable; determining that the IO command abort state associated with the IO command is aborted; determining that the IO command abort state associated with the IO command is aborting; and determining that the IO command abort state associated with the IO command is complete. Processing the IO command based upon, at least in part, the IO command state associated with the IO command includes modifying the IO command abort state associated with the IO command based upon, at least in part, the compare-and-swap operation on the IO command-specific entry.

In another example implementation, a computing system includes at least one processor and at least one memory architecture coupled with the at least one processor, wherein the at least one processor is configured to perform operations that may include but are not limited to receiving an input/output (IO) command for processing data within a storage system. The processor may be further configured to generate an IO command-specific entry in a register based upon, at least in part, the IO command. The processor may be further configured to perform an compare-and-swap operation on the IO command-specific entry to determine an IO command state associated with the IO command. The processor may be further configured to process the IO command based upon, at least in part, the IO command state associated with the IO command.

One or more of the following example features may be included. Generating the IO command-specific entry in a register based upon, at least in part, the IO command includes generating the IO command-specific entry with one or more IO command parameters and a default IO command state. The storage system includes a non-volatile memory express (NVMe) storage system. The one or more IO parameters include one or more of: an NVMe Subsystem identifier; an NVMe controller identifier; an NVMe submission queue identifier; and an NVMe submission queue command identifier. The IO command state includes an IO command abort state. performing the compare-and-swap operation on the IO command-specific entry to determine the IO command state associated with the IO command includes one or more of: determining that the IO command abort state associated with the IO command is abortable; determining that the IO command abort state associated with the IO command is aborted; determining that the IO command abort state associated with the IO command is aborting; and determining that the IO command abort state associated with the IO command is complete. Processing the IO command based upon, at least in part, the IO command state associated with the IO command includes modifying the IO command abort state associated with the IO command based upon, at least in part, the compare-and-swap operation on the IO command-specific entry.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
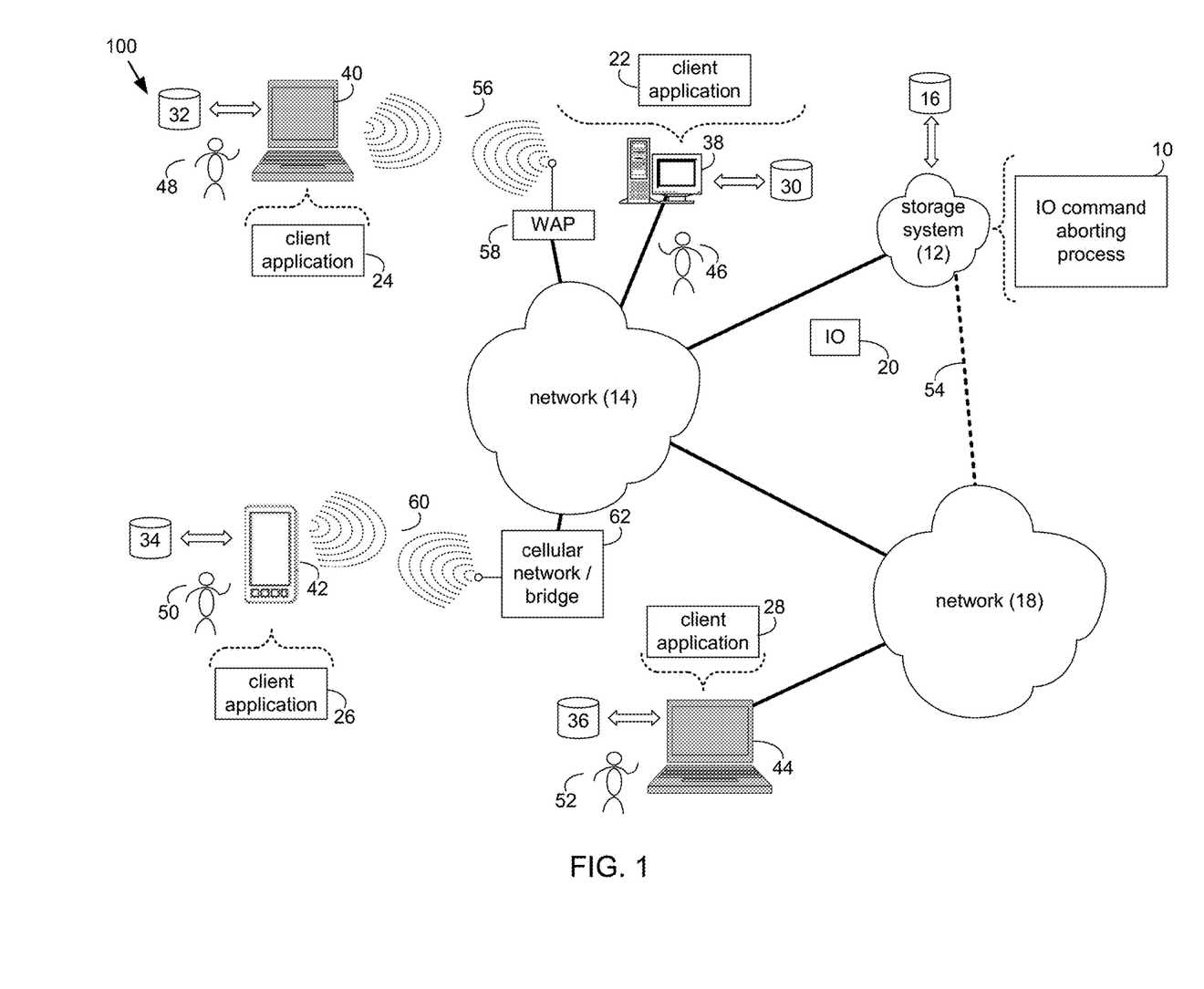
FIG. 1 is an example diagrammatic view of a storage system and an IO command aborting process coupled to a distributed computing network according to one or more example implementations of the disclosure.

System Overview:

Referring to FIG. 1, there is shown IO command aborting process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of IO command aborting process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices (e.g., Solid State memory storage devices). Additionally/alternatively, some portions of the instruction sets and subroutines of IO command aborting process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices (e.g., Solid State memory storage devices). Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as IO command aborting process 10 of FIG. 1, may include but is not limited to, receiving an input/output (IO) command for processing data within a storage system. An IO command-specific entry may be generated in a register based upon, at least in part, the IO command. An compare-and-swap operation may be performed on the IO command-specific entry to determine an IO command state associated with the IO command. The IO command may be processed based upon, at least in part, the IO command state associated with the IO command.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
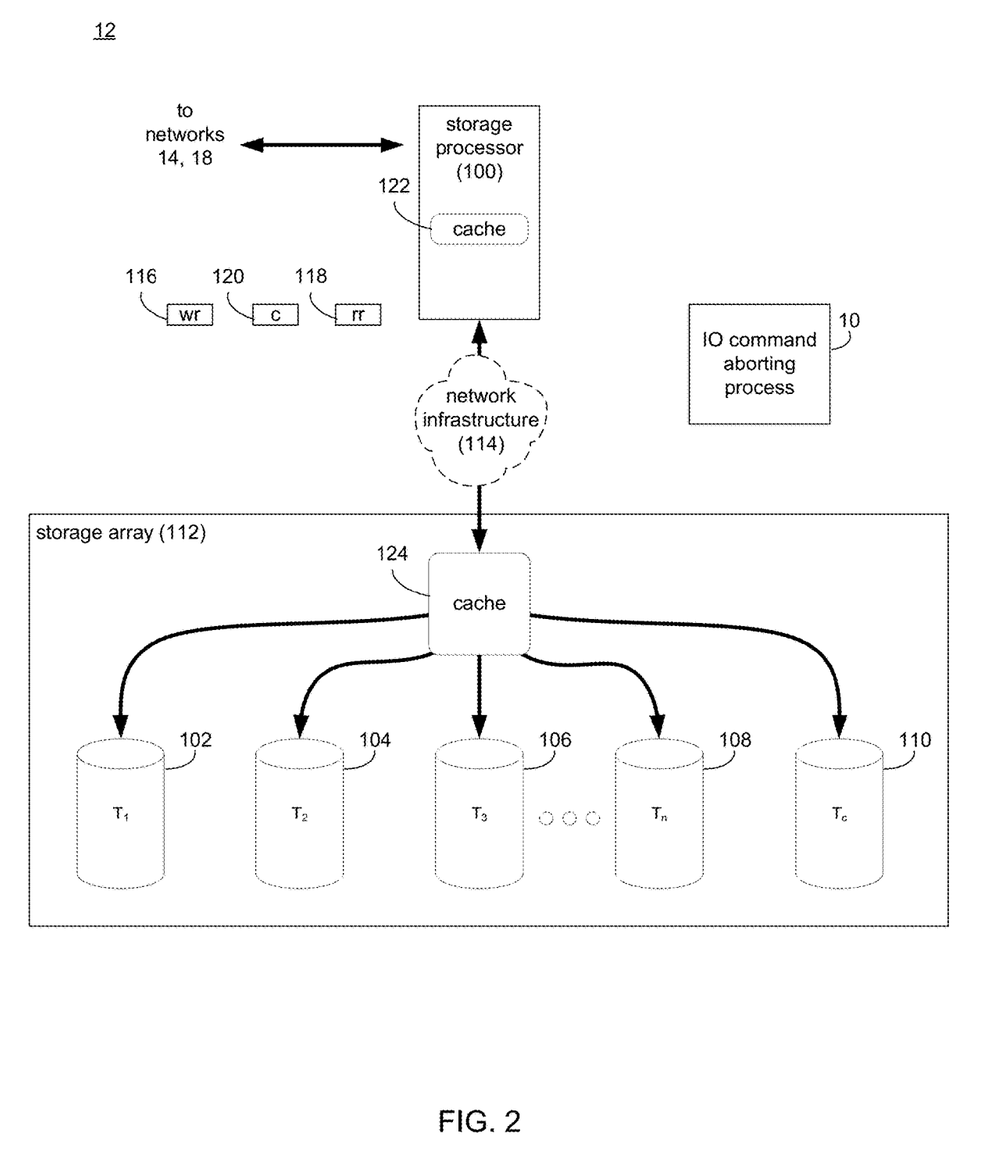
FIGS. 2-4 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network. As will be discussed in greater detail below and in some implementations, network infrastructure 114 may include one or more storage fabrics. A storage fabric may generally include switches, routers, protocol bridges, gateway devices, and cables configured to connect components of storage system 12.

Storage system 12 may execute all or a portion of IO command aborting process 10. The instruction sets and subroutines of IO command aborting process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices (e.g., Solid State memory storage devices). As discussed above, some portions of the instruction sets and subroutines of IO command aborting process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 120 be written to storage system 12) and data read request 118 (i.e. a request that content 120 be read from storage system 12).

During operation of storage processor 100, content 120 to be written to storage system 12 may be processed by storage processor 100. Additionally/alternatively and when storage processor 100 is configured as an application server, content 120 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system or a non-volatile dual in-line memory module (NVDIMM-N)).

Storage processor 100 may initially store content 120 within frontend cache memory system 122. Depending upon the manner in which frontend cache memory system 122 is configured, storage processor 100 may immediately write content 120 to storage array 112 (if frontend cache memory system 122 is configured as a write-through cache) or may subsequently write content 120 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system or a NVDIMM-N system). During operation of storage array 112, content 120 to be written to storage array 112 may be received from storage processor 100. Storage array 112 may initially store content 120 within backend cache memory system 124 prior to being stored on e.g. one or more of storage targets 102, 104, 106, 108, and coded target 110.

As discussed above, the instruction sets and subroutines of IO command aborting process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of IO command aborting process 10 may be executed by one or more processors (not shown) and one or more memory architectures (not shown) included within storage array 112.

Further and as discussed above, during the operation of storage array 112, content (e.g., content 120) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In the context of storage systems, a storage processor (e.g., storage processor 100) may include one or more central processing units (CPUs) with one or more cores, a cache memory system (e.g., cache memory system 122), and one or more network interface cards (NICs). As discussed above and in some implementations, the storage processor (e.g., storage processor 100) may be communicatively coupled with a storage array (e.g., storage array 112). In some implementations, the storage array (e.g., storage array 112) may include one or more storage devices. In some implementations, the storage array may be a non-volatile memory disk array with one or more solid-state drives (SSDs). The storage processor 100 may interact with the one or more SSDs via the non-volatile memory express (NVMe™) protocol or standard. NVMe is a trademark of NVM Express, Inc. in the United States, other countries, or both. In this manner, storage devices, such as SSDs, that are configured to communicate with a storage processor via the NVMe protocol may generally be referred to as NVMe devices.

As is known in the art, non-volatile memory express (NVMe) may generally include a host controller interface and storage protocol configured to transfer data between client systems and SSDs over a Peripheral Component Interconnect Express (PCIe) bus. Referring also to the example of FIG. 3 and in some implementations, one or more storage processors (e.g., storage processor 100 and storage processor 300) may be configured to be communicatively coupled to a storage array (e.g., storage array 112) via one or more storage fabrics (e.g., storage fabrics 302, 304). In some implementations, storage fabrics may be internal to storage system 12 and/or may be shared with clients (e.g., as shown in network 14 of FIG. 1). In this manner and as will be discussed in greater detail below, the storage system (e.g., storage system 12) may include a plurality of storage processors configured to receive a plurality of IO requests (e.g., write requests, read requests, etc.).

Figure 3:
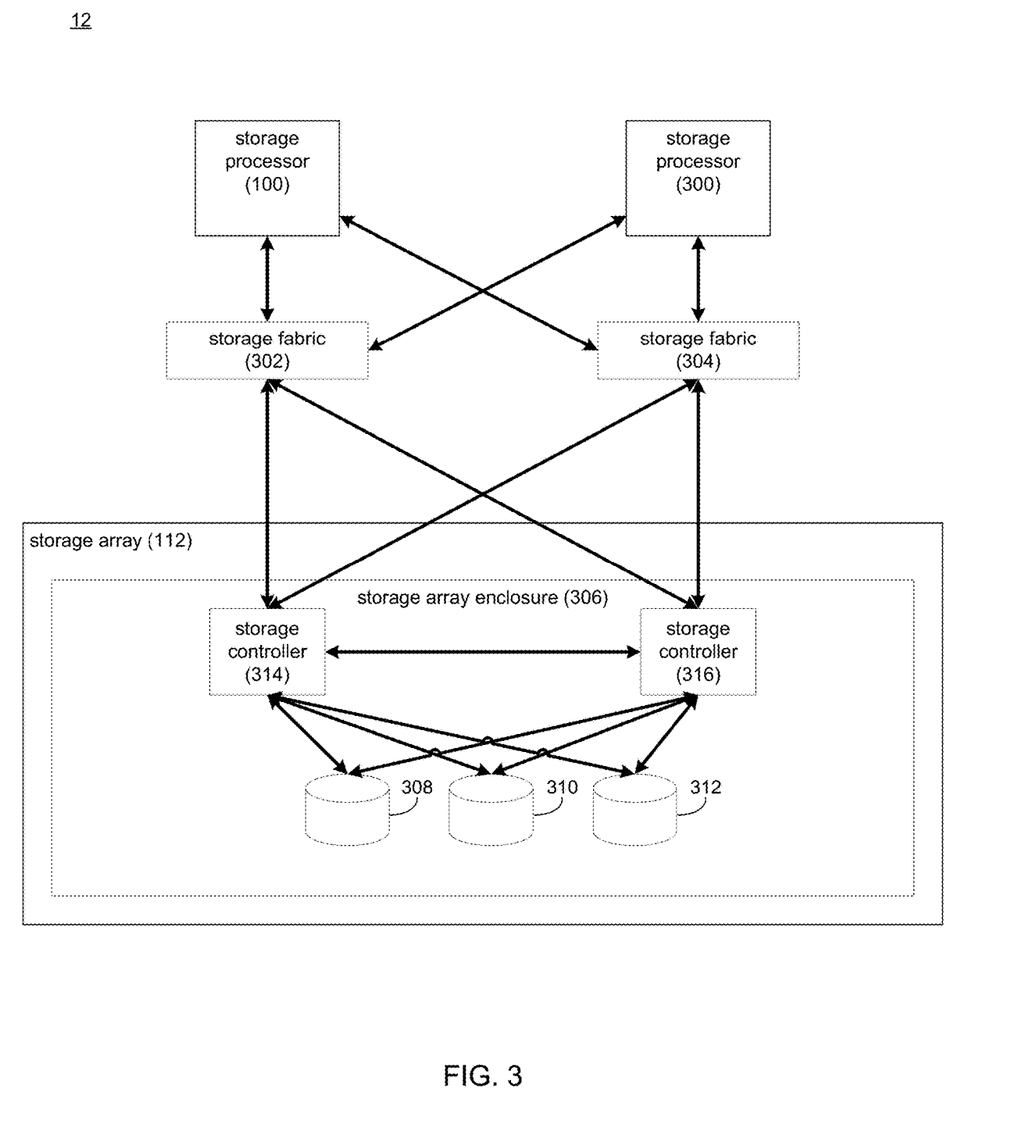

In some implementations, storage processors 100, 300 may be communicatively coupled with storage array 112 via a non-volatile memory express over fabrics protocol. NVMe-oF is a trademark of NVM Express, Inc. in the United States, other countries, or both. NVM Express over Fabrics (NVMe-oF) may generally define a common architecture that supports a range of storage networking fabrics for NVMe block storage protocol over a storage networking fabric. This includes enabling a front-side interface into storage systems, scaling out to large numbers of NVMe devices and extending the distance within a datacenter over which NVMe devices and NVMe subsystems can be accessed.

In some implementations, storage processors 100, 300 may be communicatively coupled to storage array 112 via one or more storage fabrics (e.g., storage fabrics 302, 304). In some implementations, storage fabric 302 may be a primary storage fabric while storage fabric 304 may be a high-availability or duplicate storage fabric in the event of a failure of storage fabric 302. In some implementations, storage fabrics 302, 304 may be used by storage processors 100, 300 to access storage array 112. While the example of FIG. 3 includes e.g., two storage fabrics, it will be appreciated that any number of storage fabrics may be used within the scope of the present disclosure to communicatively couple storage processors 100, 300 and storage array 112.

In some implementations, storage array 112 may include one or more storage array enclosures. In some implementations, a storage array enclosure (e.g., storage array enclosure 306) may generally include a drive carrier, one or more disk drives, a midplane, one or more storage controllers, and/or one or more persistent memory devices. In some implementations, the driver carrier of storage array enclosure 306 may be configured to hold one or more disk drives (e.g., NVMe drives 308, 310, 312). In some implementations, NVMe devices may include dual-ported NVMe devices configured to be communicatively coupled to two storage controllers. In this manner, failure of one storage controller may not impact access to each NVMe device. Storage array enclosure 306 may include a midplane configured to distribute power and signals to components within the storage array enclosure.

In some implementations, storage controllers (e.g., storage controllers 314, 316) may generally include a module configured to support, control, and monitor the storage array enclosure. In some implementations, storage controllers 314, 316 may include various input and/or output connectors for coupling one or more storage processors (e.g., storage processors 100, 300) to one or more disk drives (e.g., NVMe drives 308, 310, 312). In some implementations, storage array enclosure 306 may include dual controllers configured to provide access to the NVMe devices of storage array enclosure 306. In this manner, the dual controllers may provide no single point of failure for access to the NVMe devices of storage array 112.

The Storage System Memory Architecture:

In the context of storage systems, a storage processor (e.g., storage processor 100) may include one or more central processing units (CPUs) with one or more cores, a cache memory system (e.g., cache memory system 122), and one or more network interface cards (NICs). As discussed above and in some implementations, the storage processor (e.g., storage processor 100) may be communicatively coupled with a storage array or data array (e.g., data array 112). In some implementations, the data array (e.g., data array 112) may include one or more storage devices. In some implementations, the data array may be a non-volatile memory disk array with one or more solid-state drives (SSDs). The storage processor 100 may interact with the one or more SSDs via the non-volatile memory express (NVMe) protocol or standard. In this manner, storage devices, such as SSDs, that are configured to communicate with a storage processor via the NVMe protocol may generally be referred to as NVMe storage devices.

As is known in the art, NVMe may generally include a host controller interface and storage protocol configured to transfer data between client systems and SSDs over a Peripheral Component Interconnect Express (PCIe) bus. Referring also to the example of FIG. 4 and in some implementations, the storage system memory architecture (e.g., within the memory system 122 of storage processor 100) may be represented a user space layer (e.g., user space layer 400) and a kernel layer (e.g., kernel layer 402). A user space layer (e.g., user space layer 400) may generally include a set of memory locations in which one or more threads (e.g., threads 404, 406, 408) are executed. A thread (e.g., threads 404, 406, 408) may generally include at least a portion of an executing instance of a program or application. For example and in some implementations, one or more client electronic devices (e.g., client electronic devices 38, 40, 42, 44) may execute one or more programs or applications with data stored in a storage system (e.g., storage system 12) via a storage processor (e.g., storage processor 100). In some implementations, threads 404, 406, 408 may store user data (e.g., from client electronic devices 38, 40, 42, 44) and its metadata on a data array (e.g., data array 112) of storage system 12. As discussed above, the data array may include one or more NVMe storage devices (e.g., NVMe drives 308, 310, 312).

Figure 4:
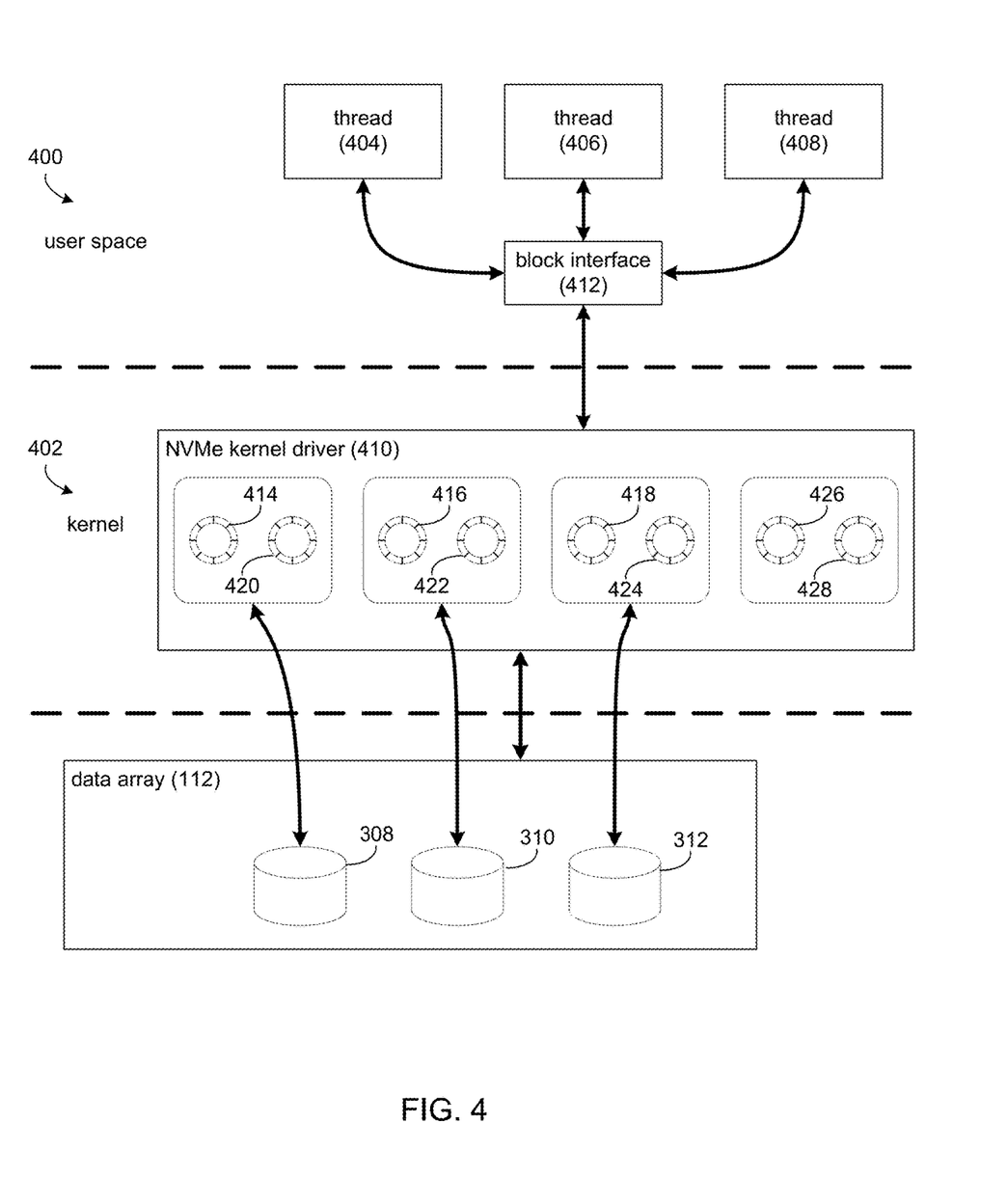

In some implementations, the kernel (e.g., kernel 402) may generally include the set of memory locations where the kernel of an operating system (OS) executes or runs and/or where one or more device drivers may execute. As is known in the art, the kernel may manage individual threads within the user space to prevent them from interfering with one another as they communicate data to and from the data array (e.g., data array 112). In some implementations, kernel 402 may be accessed by threads 404, 406, 408 within user space 400 by the use of system calls. Examples of system calls may include IO requests or operations configured to transfer data between a CPU and a peripheral device (e.g., one or more NVMe storage devices). However, it will be appreciated that other system calls are possible within the scope of the present disclosure.

In some implementations, kernel 402 may include an NVMe kernel driver (e.g., a NVMe kernel driver 410) deployed in kernel 402 for communicating data between threads 404, 406, 408 of user space 400 and one or more NVMe storage devices (e.g., NVMe drives 308, 310, 312). In some implementations, the NVMe kernel driver (e.g., NVMe kernel driver 410) may be a standard Linux® NVMe kernel driver generally available in most storage processors. In some implementations, threads 404, 406, 408 may communicate with NVMe kernel driver 410 via a block interface (e.g., block interface 412).

In some implementations, NVMe kernel driver 410 may include one or more IO submission queues (e.g., IO submission queues 414, 416, 418) and one or more IO completion queues (e.g., IO completion queues 420, 422, 424). In some implementations, IO submission queues 414, 416, 418 and IO completion queues 420, 422, 424 may be organized in pairs (e.g., IO submission queue 414 paired with IO completion queue 420). IO submission queue 414 may generally send one or more IO requests (e.g., IO request 20) to the one or more NVMe storage devices (e.g., NVMe drives 308, 310, 312) and IO completion queue 420 may generally receive a completion for a corresponding IO request of IO submission queue 414. In some implementations, the one or more IO submission queues and the one or more completion queues may be organized per core of a multi-core CPU, per NVMe storage device, and/or per core and per NVMe storage device (e.g., one or more IO submission queues and one or more IO completion queues for each core and NVMe storage device). In the example of FIG. 4, suppose for example purposes only that the CPU of storage processor 100 is a single core CPU. In this example, a pair of IO submission queues and IO completion queues may be created by NVMe kernel driver 410 for each NVMe storage device (e.g., NVMe drives 308, 310, 312) of a data array (e.g., data array 112). However, it will be appreciated that any number of CPU cores and/or NVMe storage devices may be used within the scope of the present disclosure.

In some implementations, NVMe kernel driver 410 may include one or more administrative IO submission queues (e.g., IO submission queue 426) and one or more administrative IO completion queues (e.g., IO completion queue 428) which may or may not be organized in pairs. Administrative IO submission queue 426 may be configured to provide one or more management operations (e.g., create and/or destroy IO submission queues, create and/or destroy IO completion queues, etc.) and administrative IO completion queue 428 may be configured to receive completions for a corresponding IO request of administrative IO submission queue 426.

Figure 5:
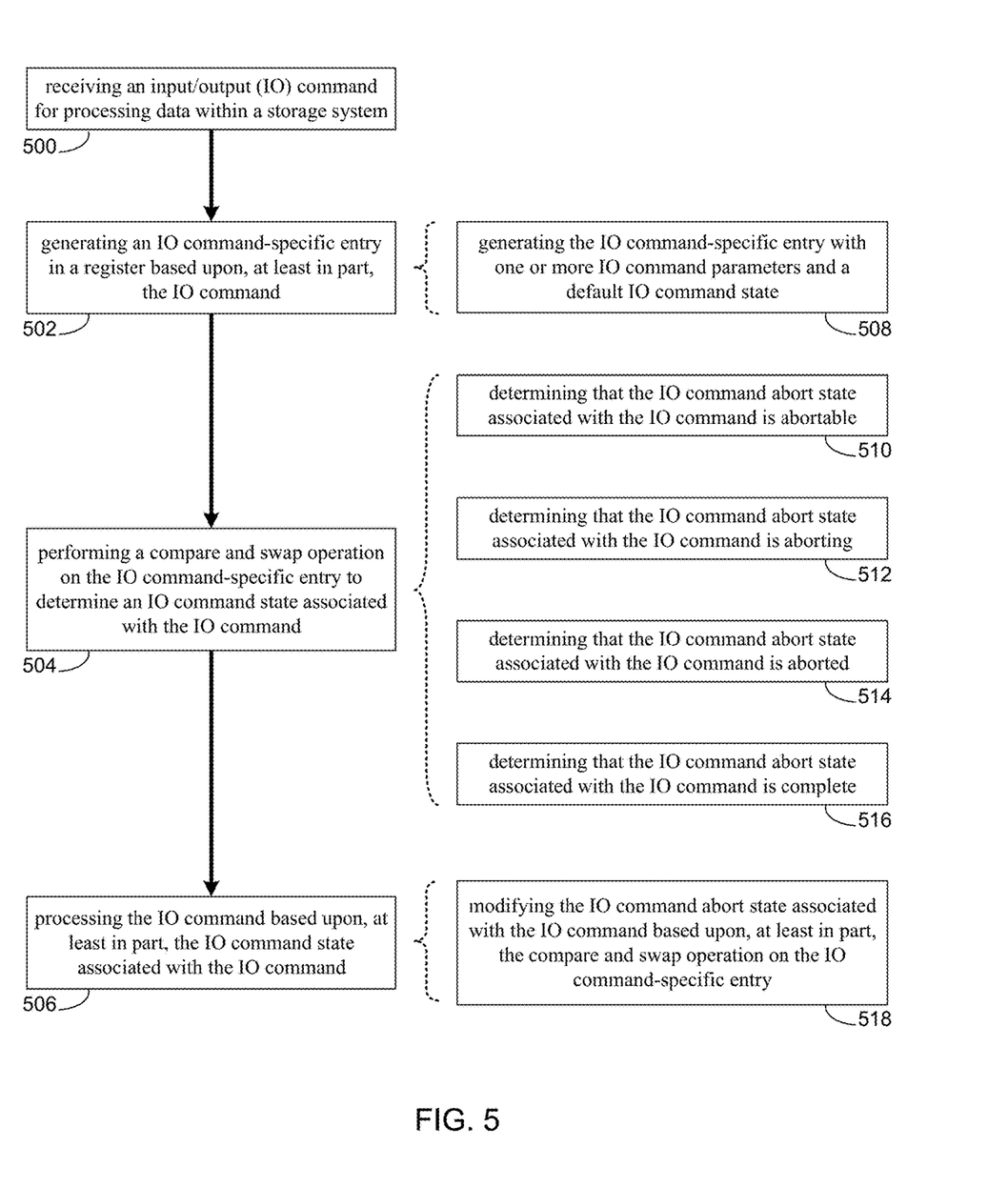
FIG. 5 is an example flowchart of the IO command aborting process of FIG. 1 according to one or more example implementations of the disclosure.

The IO Command Aborting Process:

Referring also to FIG. 5 and in some implementations, IO command aborting process 10 may receive 500 an input/output (IO) command for processing data within a storage system. An IO command-specific entry may be generated 502 in a register based upon, at least in part, the IO command. An compare-and-swap operation may be performed 504 on the IO command-specific entry to determine an IO command state associated with the IO command. The IO command may be processed 506 based upon, at least in part, the IO command state associated with the IO command.

As will be discussed in greater detail below, implementations of the present disclosure may allow a lockless approach to IO command aborting in a multithreaded storage system. For example, many storage systems utilize non-volatile memory express (NVMe) devices (i.e., NVMe drives or storage devices that support NVMEoF connectivity) according to the NVMe storage protocol and/or other storage protocols. Such storage protocols allow for IO command aborting/termination by issuing a subsequent IO command configured to instruct the storage system to abort or terminate the specified IO command. In the specific case of NVMe, an NVMe IO command may be submitted for processing on a particular IO submission queue of a specific storage controller. To abort a particular NVMe IO command, an NVMe IO abort command may be issued to the same storage controller that the NVMe IO command was submitted to. Conventional approaches to allowing for NVMe IO commands require some lock over the command. The completion flow and the abort flow will take the lock and thus the command state will be consistent with the applied logic. The problem with this approach is that it hurts performance: "lock" and "unlock" operations are heavy and are required for every IO command even if it is not being aborted, and when an IO command is being aborted, it is undesirable to just "spin" in the completion flow. Accordingly and as will be discussed in greater detail below, IO command aborting process 10 may provide state consistency without using any locking mechanism(s).

In some implementations, IO command aborting process 10 may receive 500 an input/output (IO) command for processing data within a storage system. For example and as discussed above, IO commands may include but are not limited to data write request 116 (e.g., a request that content 120 be written to storage system 12) and data read request 118 (i.e. a request that content 120 be read from storage system 12). Referring also to FIG. 5, storage system 12 may receive 500 an IO command (e.g., IO command 600) for processing. In this example, IO command 600 may be configured to read data from or write data to one or more NVMe devices (e.g., NVMe drives 308, 310, 312) of a data array (e.g., data array 112). As will be discussed in greater detail below, it may be desirable to abort or terminate the execution of the IO command.

The storage system may include a non-volatile memory express (NVMe) storage system. As discussed above, a non-volatile memory express (NVMe) storage system may generally include a host controller interface and storage protocol configured to transfer data between client systems and SSDs over a Peripheral Component Interconnect Express (PCIe) bus. Referring again to the example of FIG. 3 and in some implementations, one or more storage processors (e.g., storage processor 100 and storage processor 300) may be configured to be communicatively coupled to a storage array (e.g., storage array 112) via one or more storage fabrics (e.g., storage fabrics 302, 304). The storage processors (e.g., storage processor 100 and storage processor 300) may interact with the one or more storage controllers (e.g., storage controllers 314, 316). In this manner, storage devices, such as SSDs, that are configured to communicate with a storage processor via the NVMe protocol may generally be referred to as NVMe storage devices (e.g., NVMe drives 308, 310, 312).

In some implementations, IO command aborting process 10 may generate 502 an IO command-specific entry in a register based upon, at least in part, the IO command. An IO command-specific entry may generally include a bespoke identifier for each IO command. Referring again to the example of FIG. 6, IO command aborting process 10 may receive 500 an IO command (e.g., IO command 600) and may generate 502 an IO command-specific entry (e.g., IO command-specific entry 602) and store the IO command-specific entry (e.g., IO command-specific entry 602) within a register (e.g., register 604). A register (e.g., register 604) may generally include a type of computer memory used to quickly accept, store, and transfer data and instructions that are being used immediately by a central processing unit (CPU) of a storage processor (e.g., storage processor 100). Register 604 may be communicatively coupled to and/or integrated within a storage processor (e.g., storage processor 100).

Figure 6:
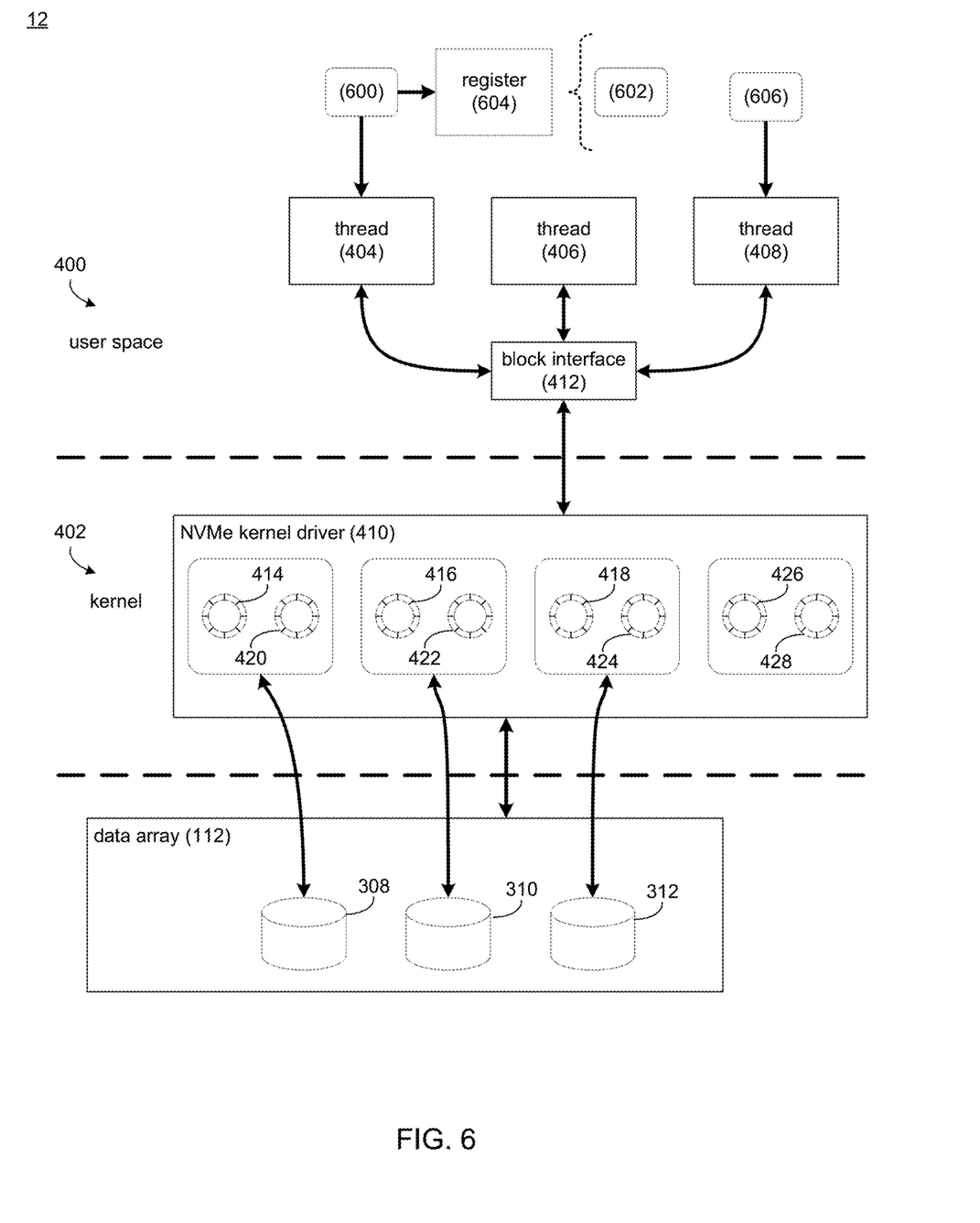
FIG. 6 is an example diagrammatic view of the storage system of FIG. 1 according to one or more example implementations of the disclosure.

Generating 502 the IO command-specific entry in a register based upon, at least in part, the IO command may include generating 508 the IO command-specific entry with one or more IO command parameters and a default IO command state. For example, the IO command-specific entry (e.g., IO command-specific entry 602) may be defined to be a unique or bespoke representation of the IO command (e.g., IO command 600) using one or more IO command parameters associated with the IO command (e.g., IO command 600).

In one example, the one or more IO parameters may include one or more of: an NVMe Subsystem identifier; an NVMe controller identifier; an NVMe submission queue identifier; and an NVMe submission queue command identifier. For example, each storage system (e.g., storage system 12) may include one or more NVMe Subsystems. Referring again to FIG. 3, storage system 12 may include one NVMe Subsystem. However, it will be appreciated that storage system 12 may include any number of NVMe Subsystems within the scope of the present disclosure. In this manner, the one or more IO parameters may include a reference to each NVMe Subsystem such that each NVMe Subsystem may be uniquely identified.

Referring again to FIG. 3, the storage system (e.g., storage system 12) may include one or more storage controllers (e.g., storage controllers 314, 316). In this example, IO command aborting process 10 may generate 502 an IO command-specific entry (e.g., IO command-specific entry 602) with an NVMe controller identifier that specifies a particular storage controller within the storage system (e.g., storage system 12).

Referring again to FIG. 4, each storage controller (e.g., storage controllers 314, 316) may include an NVMe kernel driver (e.g., NVMe kernel driver 410) configured to process IO commands on the plurality of NVMe devices (e.g., NVMe drives 308, 310, 312). As discussed above, each NVMe kernel driver (e.g., NVMe kernel driver 410) may include one or more IO submission queues (e.g., IO submission queues 414, 416, 418). In this example, IO command aborting process 10 may generate 502 an NVMe submission queue identifier associated with an IO command (e.g., IO command 600). In this manner, the particular NVMe IO submission queue (e.g., IO submission queues 414, 416, 418) of a storage controller (e.g., storage controllers 314, 316) may be uniquely identified.

In some implementations, each IO command of an IO submission queue may have a particular IO command identifier. In this example, IO command aborting process 10 may generate 502 an IO command identifier associated with an IO command (e.g., IO command 600). In this manner, the particular IO command stored in an IO submission queue (e.g., IO submission queues 414, 416, 418) may be uniquely identified.

In some implementations, IO command aborting process 10 may generate 502 the IO command-specific entry (e.g., IO command-specific entry 602) using the combination of one or more of the NVMe Subsystem identifier; the NVMe controller identifier; the NVMe submission queue identifier; the NVMe submission queue command identifier; and/or a default IO command state. The default IO command state may generally include an initial IO command state. In one example and as will be discussed in greater detail below, this initial IO command state may indicate that the IO command-specific entry is free. However, it will be appreciated that the default or initial IO command state may be defined as any value within the scope of the present disclosure.

In some implementations, the one or more IO parameters may be reused as IO commands are processed. For example, suppose that an IO command is processed from a particular IO submission queue of a specific storage controller. In this example, once the IO command is processed, certain IO parameters of the IO command-specific entry (e.g., IO command-specific entry 602) may be reused. However, to address this situation, IO command aborting process 10 may generate 508 the IO command-specific entry (e.g., IO command-specific entry 602) by combining the one or more IO command parameters and the default IO command state. In this example and as will be discussed in greater detail below, the IO command state may be used, in combination with the one or more IO command parameters, to uniquely identify the IO command; even if the one or more IO parameters are reused after processing a previous IO command.

In one example, the IO command-specific entry (e.g., IO command-specific entry 602) may include a number of bits associated with an NVMe Subsystem identifier (e.g., 1 bit); a number of bits associated with an NVMe controller identifier (e.g., 16 bits); a number of bits associated with a particular NVMe submission queue (e.g., 16 bits); a number of bits associated with a particular IO command within the submission queue (e.g., 16 bits); and a number of bits associated with a particular IO command state (e.g., 3 bits). It will be appreciated that the IO command-specific entry (e.g., IO command-specific entry 602) may include any number of bits within the scope of the present disclosure for various IO parameters and/or the IO command state.

In some implementations, IO command aborting process 10 may perform 504 a compare-and-swap operation on the IO command-specific entry to determine an IO command state associated with the IO command. As is known in the art, a compare-and-swap operation is an atomic instruction used in multithreading to achieve synchronization. The operation compares the contents of a memory location with a given value and, only if they are the same, modifies the contents of that memory location to a new given value. This is done as a single atomic operation. The atomicity guarantees that the new value is calculated based on up-to-date information; if the value had been updated by another thread in the meantime, the write would fail.

IO command aborting process 10 may perform 504 the compare-and-swap operation on the IO command-specific entry (e.g., IO command-specific entry 602) to determine an IO command state. For example, if, during the compare-and-swap operation, one of the attributes of the IO command-specific entry (e.g., IO command-specific entry 602) is changed, the compare-and-swap operation will fail. This may prevent the situation where an abort IO command is received for a particular IO command but the IO command has already completed and the IO command parameters are reused for another IO command. In conventional approaches, the original IO command would be locked upon receiving the abort IO command and/or the new IO command would be erroneously aborted. However, because a compare-and-swap operation may be performed on the entire register (i.e., all the bits of the register), the compare-and-swap operation will fail if the IO command was reused.

As the reading and writing of the IO command-specific entry (e.g., IO command-specific entry 602) from the register (e.g., register 604) is performed in a single memory operation, implementations of the present disclosure may reduce the number of memory operations needed to process abort IO commands within the storage system from the at least four memory operations required for locking and unlocking to only one memory operation.

In some implementations, the IO command state may include an IO command abort state. As discussed above, the IO command state may generally indicate the processing status of the IO command within the storage system. In one example, the IO command state may include the IO command's abort state or status. Examples of the IO command abort state include, but are not limited to, abortable; aborted; aborting; complete; and free. An abortable IO command may reference an IO command that is being processed but not yet complete. An aborting IO command may reference an IO command that is currently being aborted. An aborted IO command may reference an IO command that has been aborted. A completed IO command may reference an IO command that has been processed during the aborting state. While several example IO command abort states have been described, it will be appreciated that these are for example purposes only and that any number of or type of IO command abort state may be utilized within the scope of the present disclosure.

Performing 504 the compare-and-swap operation on the IO command-specific entry to determine the IO command state associated with the IO command may include one or more of: determining 510 that the IO command abort state associated with the IO command is abortable; determining 512 that the IO command abort state associated with the IO command is aborting; determining 514 that the IO command abort state associated with the IO command is aborted; and determining 516 that the IO command abort state associated with the IO command is complete. For example and as will be described below in greater detail below, IO command aborting process 10 may perform particular compare-and-swap operations to determine the IO command state. As will be discussed in greater detail below, by utilizing a compare-and-swap operation, IO command aborting process 10 may perform 504 an atomic operation to transition the IO command through various states or steps of processing without locking the IO command.

Figure 7:
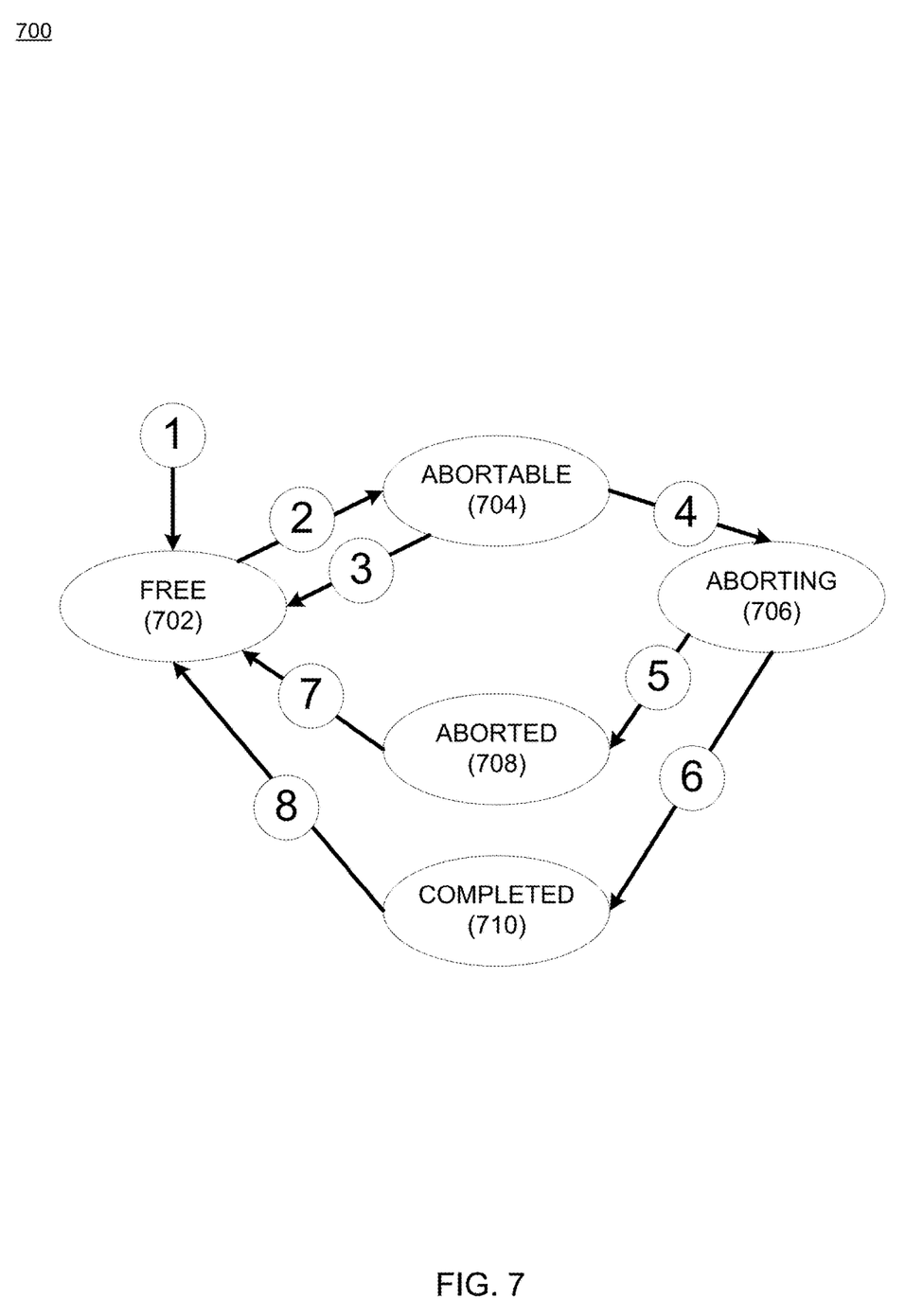
FIG. 7 is an example state diagram of the IO command aborting process of FIG. 1 according to one or more example implementations of the disclosure.

In some implementations, IO command aborting process 10 may process 506 the IO command based upon, at least in part, the IO command state associated with the IO command. Referring also the example of FIG. 7, the IO command abort state may be utilized to process the IO command according to the state diagram (e.g., state diagram 700). For example and as discussed above, when an IO command (e.g., IO command 600) is received 500, IO command aborting process 10 may generate 502 an IO command-specific entry (e.g., IO command-specific entry 602) for the IO command (e.g., IO command 600) and may store the IO command-specific entry (e.g., IO command-specific entry 602) in a register (e.g., register 604). As shown in FIG. 7, IO command aborting process 10 may transition the IO command abort state (e.g., shown as step "1") to the free state (e.g., free state 702). In response to generating 502 the IO command-specific entry (e.g., IO command-specific entry 602), IO command aborting process 10 may perform 504 one or more compare-and-swap operations on the IO command specific entry (e.g., IO command-specific entry 602) as shown in the exemplary pseudocode provided below:

---
Command Completion:
---
```
cmd_data64_copy = cmd_data64;
if cmd_data64_copy.state == ABORTABLE :
   cmd_data64_new = cmd_data64_copy
   cmd_data64_new.state = FREE
   atomic_compare_and_swap(variable=cmd_data64,
   from=cmd_data64_copy, to=cmd_data64_new)
      if success :
         return
      else :
         retry
if cmd_data64_copy.state == ABORTING :
   cmd_data64_new = cmd_data64_copy
   cmd_data64_new.state = COMPLETED
   atomic_compare_and_swap(variable=cmd_data64,
   from=cmd_data64_copy, to=cmd_data64_new)
      if success :
         return
      else :
         retry
// state is ABORTED.
cmd_data64.state = FREE
```

---
Abort Handling:
---
```
if cmd_data64_copy.state != ABORTABLE :
   return
cmd_data64_new = cmd_data64_copy
cmd_data64_new.state = ABORTING
atomic_compare_and_swap(variable=cmd_data64, from=cmd_data64_copy,
to=cmd_data64_new)
if failure :
   return
abort( ) // abort logic
cmd_data64_copy = cmd_data64_new
cmd_data64_new.state = ABORTED
atomic_compare_and_swap(variable=cmd_data64, from=cmd_data64_copy,
to=cmd_data64_new)
if success :
   return
// state is COMPLETED
cmd_data64.state = FREE
```

As shown above in the example pseudocode and the state diagram of FIG. 7, IO command aborting process 10 may process 506 the IO command (e.g., IO command 600) by transitioning the IO command abort state from the free state (e.g., free state 702) to the abortable state (e.g., abortable state 704). This transition is shown as step "2" in FIG. 7. IO command aborting process 10 may then determine whether the IO command abort state is abortable (e.g., abortable state 704). If the IO command abort state is determined 510 to be abortable (e.g., abortable state 704), IO command aborting process 10 may perform 504 a compare-and-swap operation to determine if the IO command has completed. If so, IO command aborting process 10 may transition the IO command abort state from the free state (e.g., free state 702) to the abortable state (e.g., abortable state 704). This transition is shown as step "3" in FIG. 7. If not, IO command aborting process 10 may remain in the abortable state (e.g., abortable stage 704).

In response to determining 510 that the IO command abort state is abortable (e.g., abortable state 704), IO command aborting process 10 may perform 504 a compare-and-swap operation to determine if the IO command is being aborted. For example and referring again to the example of FIG. 6, suppose IO command aborting process 10 receives an abort IO command (e.g., abort IO command 606) that designates a particular IO command (e.g., IO command). In this example, IO command aborting process 10 may process the abort IO command (e.g., abort IO command 606) to identify the IO command (e.g., IO command 600). IO command aborting process 10 may determine proceed to abort the IO command (e.g., IO command 600). In response to determining that the IO command is aborting, IO command aborting process 10 may transition the IO command abort state from the abortable state (e.g., abortable state 704) to the aborting state (e.g., aborting state 706). This transition is shown as step "4" in FIG. 7. If not, IO command aborting process 10 may remain in the abortable state (e.g., abortable stage 704).

In response to determining 514 that the IO command abort state is aborting (e.g., aborting state 706), IO command aborting process 10 may perform 504 a compare-and-swap operation to determine if the IO command is aborted. If so, IO command aborting process 10 may transition the IO command abort state from the aborting state (e.g., aborting state 706) to the aborted state (e.g., aborted state 708). This transition is shown as step "5" in FIG. 7. Additionally, IO command aborting process 10 may transition the IO command abort state from the aborting state (e.g., aborting state 706) to the completed state (e.g., completed state 710). This transition is shown as step "6" in FIG. 7. In response to transitioning the IO command abort state to the aborted state (e.g., completed state 708), IO command aborting process 10 may transition to the free state (e.g., free state 702). This transition is shown as step "7" in FIG. 7. Further and in response to transitioning the IO command abort state to the completed state (e.g., completed state 710), IO command aborting process 10 may transition to the free state (e.g., free state 702). This transition is shown as step "8" in FIG. 7.

Processing 506 the IO command based upon, at least in part, the IO command state associated with the IO command may include modifying 518 the IO command abort state associated with the IO command based upon, at least in part, the one or more compare-and-swap operations on the IO command-specific entry. For example and as discussed above, when performing the one or more compare-and-swap operations on the IO command-specific entry (e.g., IO command-specific entry 602), IO command aborting process 10 may modify 518 the IO command abort state associated with the IO command (e.g., IO command 600). As discussed above, IO command aborting process 10 may utilize the results of each compare-and-swap operation to modify 518 the IO command abort state. For example, IO command aborting process 10 may update the IO command-specific entry (e.g., IO command-specific entry 602) associated with an IO command (e.g., IO command 600) in response to modifying 518 the IO command abort state.

In one example, suppose that IO command aborting process 10 is in the abortable state (e.g., abortable state 704) and that IO command aborting process 10 performs 504 a compare-and-swap operation on the IO command-specific entry (e.g., IO command-specific entry 602). In this example, IO command aborting process 10 may modify 518 the IO command abort state associated with the IO command (e.g., IO command 600) from the abortable state (e.g., abortable state 704) to the free state (e.g., free state 702). Accordingly, IO command aborting process 10 may update the IO command-specific entry (e.g., IO command-specific entry 602) with the modified IO command abort state (e.g., free state 702).

In another example, suppose that IO command aborting process 10 is in the abortable state (e.g., abortable state 704) and that IO command aborting process 10 performs 504 a compare-and-swap operation on the IO command-specific entry (e.g., IO command-specific entry 602). In this example, IO command aborting process 10 may modify 518 the IO command abort state associated with the IO command (e.g., IO command 600) from the abortable state (e.g., abortable state 704) to the aborting state (e.g., aborting state 706). Accordingly, IO command aborting process 10 may update the IO command-specific entry (e.g., IO command-specific entry 602) with the modified IO command abort state (e.g., aborting state 706).

Further suppose that IO command aborting process 10 is in the aborting state (e.g., aborting state 706) and that IO command aborting process 10 performs 504 a compare-and-swap operation on the IO command-specific entry (e.g., IO command-specific entry 602). In this example, IO command aborting process 10 may modify 518 the IO command abort state associated with the IO command (e.g., IO command 600) from the aborting state (e.g., aborting state 706) to the aborted state (e.g., aborted state 708). Accordingly, IO command aborting process 10 may update the IO command-specific entry (e.g., IO command-specific entry 602) with the modified IO command abort state (e.g., aborted state 708).

In another example, suppose that IO command aborting process 10 is in the aborting state (e.g., aborting state 706) and that IO command aborting process 10 performs a compare-and-swap operation on the IO command-specific entry (e.g., IO command-specific entry 602). In this example, IO command aborting process 10 may modify 518 the IO command abort state associated with the IO command (e.g., IO command 600) from the aborting state (e.g., aborting state 706) to the completed state (e.g., completed state 710). Accordingly, IO command aborting process 10 may update the IO command-specific entry (e.g., IO command-specific entry 602) with the modified IO command abort state (e.g., completed state 710).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving an input/output (IO) command for processing data within a storage system;
   generating an IO command-specific entry in a register based upon, at least in part, the IO command;
   performing a compare-and-swap operation on the IO command-specific entry to determine an IO command state associated with the IO command; and
   processing the IO command based upon, at least in part, the IO command state associated with the IO command.

2. The computer-implemented method of claim 1, wherein generating the IO command-specific entry in a register based upon, at least in part, the IO command includes:
   generating the IO command-specific entry with one or more IO command parameters and a default IO command state.

3. The computer-implemented method of claim 2, wherein the storage system includes a non-volatile memory express (NVMe) storage system.

4. The computer-implemented method of claim 3, wherein the one or more IO parameters include one or more of:
   an NVMe Subsystem identifier;
   an NVMe controller identifier;
   an NVMe submission queue identifier; and
   an NVMe submission queue command identifier.

5. The computer-implemented method of claim 1, wherein the IO command state includes an IO command abort state.

6. The computer-implemented method of claim 5, wherein performing the compare-and-swap operation on the IO command-specific entry to determine the IO command state associated with the IO command includes one or more of:
   determining that the IO command abort state associated with the IO command is abortable;
   determining that the IO command abort state associated with the IO command is aborted;
   determining that the IO command abort state associated with the IO command is aborting; and
   determining that the IO command abort state associated with the IO command is complete.

7. The computer-implemented method of claim 5, wherein processing the IO command based upon, at least in part, the IO command state associated with the IO command includes:
   modifying the IO command abort state associated with the IO command based upon, at least in part, the compare-and-swap operation on the IO command-specific entry.

8. A computer program product residing on a non-transitory computer readable medium having a plurality of instructions stored thereon which, when executed by a processor, cause the processor to perform operations comprising:
   receiving an input/output (IO) command for processing data within a storage system;
   generating an IO command-specific entry in a register based upon, at least in part, the IO command;
   performing a compare-and-swap operation on the IO command-specific entry to determine an IO command state associated with the IO command; and
   processing the IO command based upon, at least in part, the IO command state associated with the IO command.

9. The computer program product of claim 8, wherein generating the IO command-specific entry in a register based upon, at least in part, the IO command includes:
  generating the IO command-specific entry with one or more IO command parameters and a default IO command state.

10. The computer program product of claim 9, wherein the storage system includes a non-volatile memory express (NVMe) storage system.

11. The computer program product of claim 10, wherein the one or more IO parameters include one or more of:
  an NVMe Subsystem identifier;
  an NVMe controller identifier;
  an NVMe submission queue identifier; and
  an NVMe submission queue command identifier.

12. The computer program product of claim 8, wherein the IO command state includes an IO command abort state.

13. The computer program product of claim 12, wherein performing the compare-and-swap operation on the IO command-specific entry to determine the IO command state associated with the IO command includes one or more of:
  determining that the IO command abort state associated with the IO command is abortable;
  determining that the IO command abort state associated with the IO command is aborted;
  determining that the IO command abort state associated with the IO command is aborting; and
  determining that the IO command abort state associated with the IO command is complete.

14. The computer program product of claim 12, wherein processing the IO command based upon, at least in part, the IO command state associated with the IO command includes:
  modifying the IO command abort state associated with the IO command based upon, at least in part, the compare-and-swap operation on the IO command-specific entry.

15. A computing system comprising:
  a memory; and
  a processor configured to receive an input/output (IO) command for processing data within a storage system, wherein the processor is further configured to generate an IO command-specific entry in a register based upon, at least in part, the IO command, wherein the processor is further configured to perform a compare-and-swap operation on the IO command-specific entry to determine an IO command state associated with the IO command, and wherein the processor is further configured to process the IO command based upon, at least in part, the IO command state associated with the IO command.

16. The computing system of claim 15, wherein generating the IO command-specific entry in a register based upon, at least in part, the IO command includes:
  generating the IO command-specific entry with one or more IO command parameters and a default IO command state.

17. The computing system of claim 16, wherein the storage system includes a non-volatile memory express (NVMe) storage system.

18. The computing system of claim 17, wherein the one or more IO parameters include one or more of:
  an NVMe Subsystem identifier;
  an NVMe controller identifier;
  an NVMe submission queue identifier; and
  an NVMe submission queue command identifier.

19. The computing system of claim 15, wherein the IO command state includes an IO command abort state.

20. The computing system of claim 19, wherein performing the compare-and-swap operation on the IO command-specific entry to determine the IO command state associated with the IO command includes one or more of:
  determining that the IO command abort state associated with the IO command is abortable;
  determining that the IO command abort state associated with the IO command is aborted;
  determining that the IO command abort state associated with the IO command is aborting; and
  determining that the IO command abort state associated with the IO command is complete.

* * * * *